(12) United States Patent
Ben-Chorin et al.

(10) Patent No.: US 9,172,933 B2
(45) Date of Patent: Oct. 27, 2015

(54) CORRECTING ANAMOLOUS TEXTURE AND FEATURE WIDTH EFFECTS IN A DISPLAY THAT USES A MULTI PRIMARY COLOR UNIT SCHEME

(71) Applicant: SAMSUNG DISPLAY CO., LTD., Yongin, Gyeonggi-Do (KR)

(72) Inventors: Moshe Ben-Chorin, Rehovot (IL); Assaf Pagi, Hod Hasharon (IL)

(73) Assignee: Samsung Display Co., Ltd. (KR)

( * ) Notice: Subject to any disclaimer, the term of this patent is extended or adjusted under 35 U.S.C. 154(b) by 440 days.

(21) Appl. No.: 13/654,282

(22) Filed: Oct. 17, 2012

(65) Prior Publication Data
US 2014/0104294 A1 Apr. 17, 2014

(51) Int. Cl.
| G09G 5/00 | (2006.01) |
| G09G 5/02 | (2006.01) |
| G09G 5/10 | (2006.01) |
| G06K 9/00 | (2006.01) |
| G06K 9/40 | (2006.01) |
| G06K 9/36 | (2006.01) |
| H04N 1/54 | (2006.01) |
| H04N 1/40 | (2006.01) |
| G06F 3/08 | (2006.01) |
| H04N 9/73 | (2006.01) |
| H04N 9/67 | (2006.01) |
| G09G 3/20 | (2006.01) |

(52) U.S. Cl.
CPC ............... *H04N 9/67* (2013.01); *G09G 3/2003* (2013.01); *G09G 3/2007* (2013.01); *G09G 2300/0452* (2013.01); *G09G 2320/0233* (2013.01); *G09G 2320/0238* (2013.01); *G09G 2320/0242* (2013.01); *G09G 2340/06* (2013.01)

(58) Field of Classification Search
CPC combination set(s) only.
See application file for complete search history.

(56) References Cited

U.S. PATENT DOCUMENTS

| 2002/0122019 A1* | 9/2002 | Baba et al. ...................... 345/88 |
| 2005/0169551 A1* | 8/2005 | Messing et al. ............... 382/260 |
| 2007/0252904 A1* | 11/2007 | Rosen ........................... 348/241 |
| 2009/0058873 A1* | 3/2009 | Brown Elliott et al. ....... 345/589 |
| 2009/0201309 A1* | 8/2009 | Demos .......................... 345/589 |
| 2010/0013848 A1* | 1/2010 | Hekstra et al. ................. 345/589 |
| 2010/0118045 A1* | 5/2010 | Brown Elliott et al. ....... 345/589 |
| 2010/0149204 A1* | 6/2010 | Han .............................. 345/589 |
| 2013/0215360 A1* | 8/2013 | Pollack et al. .................. 349/61 |
| 2014/0079336 A1* | 3/2014 | Venkataraman et al. ..... 382/275 |

* cited by examiner

*Primary Examiner* — Wesner Sajous
(74) *Attorney, Agent, or Firm* — Innovation Counsel LLP

(57) ABSTRACT

A method for correcting artifact effects is a multi-primary color matrix display is provided where the display is populated by an array of red-green-blue (RGB) pixels and of non-RGB pixels. The method includes receiving all-RGB data in an all-RGB format; converting the all-RGB data into multi-primary data in accordance with a predefined multi-primary color scheme, testing for and applying one or more artifact correction modifications to each of primary colors that is not represented by all pixels, wherein the modification includes shifting of intensity production of a given non-primary color to a metameric equivalent of pixels in one or more adjacent RGB pixels.

24 Claims, 8 Drawing Sheets

FIG. 1A

| R | G | B | C | Y | B |
|---|---|---|---|---|---|
| R | Y | B | R | G | B |

FIG. 1B

| R | G | B | R | Y | B |
|---|---|---|---|---|---|
| R | Y | B | R | G | B |

FIG. 1C

| B | G | R | B | Y | R |
|---|---|---|---|---|---|
| B | Y | R | C | G | R |

CORRECTING ANAMOLOUS TEXTURE AND FEATURE WIDTH EFFECTS IN A DISPLAY THAT USES A MULTI PRIMARY COLOR UNIT SCHEME

BACKGROUND

1. Technical Field

The present disclosure of invention relates to multicolored image producing displays such as liquid crystal displays (LCDs) and more particularly to displays employing multi primary color matrices as their repeat unit.

2. Discussion of Related Technology

LCD displays (or other alike displays) that rely on backlighting and that utilize multi primary color matrices (more than just three primary and different colored sub-pixels in each of repeated matrix units) can provide the advantage of potential increase in displayable color gamut as well as the advantage of potential increase in power consumption efficiency (for example in backlighted LCD panels in terms of power consumption by the backlighting unit versus the displayed luminance).

In an exemplary multi-primary color matrix layout, a square-shaped and repeated matrix unit (MxU) that is capable of providing a full color gamut, is arranged to consist of 12 rectangular sub-pixels while using just 5 different colors—namely, 3 sub-pixels that are Red, 2 that are Green, 4 that are Blue, 2 that are Yellow and 1 that is Cyan. Such a full color and repeated matrix unit (MxU) can be seen as being divided into four square-shaped pixels, two of them being RGB pixels, 1 being a RYB pixel and 1 being a CYB pixel. One such matrix layout is shown in FIG. 1A. FIG. 1B shows an alternative variation. FIG. 1C is similar except that there are 2 RYB square pixels and only 1 RGB square pixel (the fourth pixel is a RGC pixel).

It is to be understood that for this disclosure, the image defining data signals that are originally received by the corresponding display panel is at a higher and optically less efficient pixel resolution, namely, the received image defining data signals represent an image definition having approximately twice the RGB resolution in both the horizontal and vertical directions as compared to the resolution producible for an all-one-color object by the illustrated repeat color units (MxU's) of FIGS. 1A-1C. More specifically, if the received image defining data signals are seen as defining four RGB squares in a corresponding square configuration, then in FIGS. 1A-1B, two of those original four RGB squares may be thought of as having been removed and replaced by something else while in FIG. 1C, three of those original four RGB squares may be thought of as having been removed and replaced by something else.

In other words and yet more specifically, the multi-primary color matrix layout (MxU layout) of FIG. 1A is different from a standard sub-pixel layout having all same RGB pixels. This change in layout, while beneficial for scope of producible color gamut and for efficiency of output luminance versus backlighting power consumption, may adversely affect two visual aspects. First, when trying to display different ones of uniform color fields (e.g. an all Red field next to an all Green field), the displayed textures are different from that which would be seen on a standard RGB panel because some colors (e.g., Red and Cyan in one example given below) are displayed in a more spotty (less spatially frequent and spatially uniform) way than are others (e.g., Green and Yellow in one example given below) and thus the multi-primary color matrix layouts (MxU layout) of, for example, FIGS. 1A and 1B create a false texture artifact when pure color fields are displayed. Second, since the original data arrives at the all RGB pixels resolution and since in the remapping to the gamut space of the modified multi-primary color matrix layouts (MxU layout) of, for example, FIGS. 1A and 1B, the gamut remapping eliminates some of the RGB pixels. Thus; not all colors are present in all pixels of the modified MxU layout, and thus loss of details and/or other artifacts may occur when attempting to present certain colored image features such as for example a single-pixel wide line (e.g. such as may occur when displaying single pixel wide lines and/or very fine thickness text).

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

A method for reducing texture nonuniformity and other artifacts is provided for the case where a multi-primary repeated layout (MxU) is used based on a 4 pixel repeat square (2×2 pixels) where the multi-primary repeated layout (MxU) consists of 12 sub-pixels (4×3=12) and where the sub-pixel colors are selected from the five primaries group consisting of Red, Green Blue, Yellow and Cyan (RGBYC for short).

In order to understand certain artifacts that can be undesirably caused by converting from an all-RGB pixels format of defining and image to one using the aforementioned MxU layout, some of the underlying changes that take place during conversion should first be discussed. Placing light intensity production responsibility on less frequently present ones of sub-pixels (those that are fewer in number on a per square unit area basis) reduces the aperture ratio and thus reduces the luminance efficiency. However, for power consumption efficiency purposes, a multi-primary layout that is based on a square array of 4 pixels (2×2 units) and containing 12 sub-pixels (e.g., as a 4×3 arrangement of pixels) has been found to work better. For five primary colored displays of the RGBYC kind, the five colors can be efficiently although asymmetrically distributed as respective sub-pixels among the 12 sub-pixel positions of the 4×3 arrangement. The number of sub-pixels provided for each respective primary color may be determined by considerations such as the luminance efficiency of the color matrix, the required chromaticity of the desired white point and the ratio between the luminance of each primary to the luminance of the white. A method for determining the number of sub-pixels of each primary for a given set of conditions may then be used in the design process. For example, a possible combination would contain 3 red pixels, 2 green pixels, 4 blue pixels, 2 yellow pixels and 1 cyan pixel. The four blue sub-pixels are desirable for increasing the white point color temperature to a range of e.g. ~10000 K.

When considering the ordering of this combination of 12 sub-pixels on the layout, various different considerations must be taken into account. The different primary colors must be distributed as much as possible over the pixels and not localized (tightly clustered) at a certain regions. Furthermore, the luminance (and the color) of the combinations constituting the different pixels must be as close as possible so that the spatial uniformity of the panel will be as good as possible. The arrangement should allow for metameric matches so that metameric substitution can take place, for example yellow can be (approximately) reproduced by a combination of red and green, and cyan can be (approximately) reproduced by combination of green and blue.

FIG. 1A shows one possible arrangement that meets the above criteria. The layout is composed from 2 diagonal sub-grids, one containing a diagonally-opposed pair of RGB pixels, and the other containing a RYB pixel that is diagonally-opposed to a CYB pixel. The diagonal arrangement is chosen because it improves spatial uniformity. Since there are four blue sub-pixels, these can be evenly distributed such that each pixel contains one blue sub-pixel. The two green and the two yellow sub-pixels are respectively organized as diagonally opposed to their twin so as to improve spatial distribution uniformity. The three red sub-pixels and the cyan sub-pixel fill the remaining four positions in an asymmetric manner.

The asymmetric distribution of the three red-sub-pixels and the one cyan sub-pixel can create texture artifacts that are relatively visible to the user when compared side by side with textures produced when fields of the more symmetrically distributed other primary colors also appear. It has been found beneficial to shift some of the light intensity attributed to, for example the cyan sub-pixels to colors whose asymmetry is less visible such as to the blue sub-pixels in the given example. This is possible in the layout shown in FIG. 1B which has 4 reds, 2 greens, 3 blues, 2 yellows and 1 cyan. This layout is better from the spatial distribution point of view, but since it has less blue the color temperature of the white is brought lower. Other arrangements having the same color composition, but different ordering may be also implemented such as the one shown in FIG. 1C. The advantage of the arrangement of FIG. 1B is its similarity to the standard RGB layout, so that fonts rendered based on the RGB layout would be presented nicely on it.

However, in the layout of FIG. 1A as discussed above, not all primary colors appear in all the pixels. Consequently, two layouts issues arise. One is associated with the uniformity of patches of a same when viewed from short distance, and the other with the reproducibility of primary color single pixel wide lines and features. FIG. 2 demonstrates the texture that each of the primary colors creates in the case of the layout of FIG. 1A: 210 for just the red sub-pixels being lit up, 220 for just the greens, 230 for the yellows, and 240 for the cyans. As will be explained in more detail below, the red and the cyan textures standout as being asymmetric and thus are problematic ones.

Yet another drawback of the aforementioned multi-primary color matrix is the presenting of single pixel wide lines and object boundaries (hereinafter referred to as "features"). Due to the fact that some of the primary colors are not represented in all pixels of the matrix unit (MxU) of FIG. 1A, some single pixel features that are seen in the all-RGB pixels format disappear in the multi-primary format due to there being no equivalent sub-pixel in the corresponding pixel locations. FIG. 3 shows such a lost-pixels effect in which the reproduction of green features on different background provides an undesirable result. Portion 310 illustrates the original data (all RGB pixels data) and portion 320 illustrates the way it is reproduced without corrective processing after generic conversion to multi-primary format.

One aspect of the present disclosure provides a method for correcting such artifact producing effects in a multi-primary color matrix display that includes an array of red-green-blue (RGB) and non RGB pixels. A method in accordance with the disclosure includes receiving all-RGB data in an all-RGB pixels format; converting the RGB data into multi-primary data based on a predefined multi-primary color scheme; and applying one or more corrections for reducing or eliminating the artifacts. In one case where a badly placed primary color has a metameric combination equivalent formable by sub pixels of an adjacent RGB pixel, some or all of the color intensity of the badly placed primary color is moved over to the metameric combination of sub pixels of the adjacent RGB pixel to thereby yield the approximate equivalent of the primary color. In another case where the problematic primary color is not approximately reproducible as a metameric combination of sub pixels in an adjacent RGB pixel, the correction includes shifting intensity of the primary color into diagonally opposed and adjacent RGB pixels.

Another aspect of the present disclosure provides a method for correcting single pixel wide effects in a multi-primary color matrix display that includes an array of red-green-blue (RGB) and non RGB pixels, the method comprising: receiving RGB data in an RGB format; converting the RGB data into multi-primary data, based on a predefined multi-primary color scheme; determining a multi-primary chroma and multi-primary luminance based on the multi-primary data; and applying a spatial low pass filter to the difference of the multi-primary chroma and multi primary luminance.

Yet another aspect provides a method for correcting single pixel wide effects in a multi-primary color matrix display that includes an array of red-green-blue (RGB) and non RGB pixels, the method comprising: receiving RGB data in an RGB format; converting the RGB data into multi-primary data, based on a predefined multi-primary color scheme; determining a type of single pixel feature being one of: primary on black, black on primary, primary on white, and white on primary; and applying a correction in the case of the determined types of single pixel feature by setting each pixel of a non-represented primary with a nearest combination other primary colors.

These, and additional, and/or other aspects and/or advantages of the present teachings are set forth in the below detailed description.

BRIEF DESCRIPTION OF THE DRAWINGS

For a better understanding of exemplary embodiments and to show how the same may be carried into effect, reference will now be made, purely by way of example, to the accompanying drawings in which like numerals designate corresponding elements or sections throughout.

In the accompanying drawings:

FIGS. 1A-1C respectively show three different color disposition schemes for a corresponding three possible multi-primary color matrix layouts (MxU's) as used in corresponding exemplary embodiments of the present disclosure;

The drawings together with the following detailed description make it more apparent to those skilled in the art how the present disclosure of invention may be embodied in practice to help reduce the undesirable artifact producing mechanisms recognized herein.

DETAILED DESCRIPTION

Figure 4A:
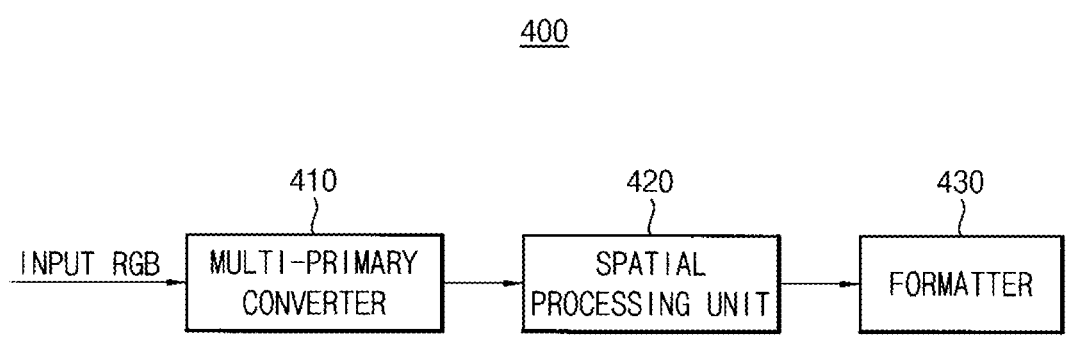
FIG. 4A shows a schematic block diagram illustrating a system according to an embodiment of the present disclosure that is configured or configurable to address the undesired effects discussed above.

Referring to FIG. 4, shown there is a schematic block diagram of an exemplary signal processing system 400 in accordance with the present disclosure of invention. System 400 includes three major units: a multi-primary converter unit 410, a spatial processing unit 420, and a formatting unit 430. The multi-primary converter unit 410 converts an input RGB data signal into a corresponding multi primary image defining signal of same resolution. This part of the signal conversion is generic (e.g., not scaled or otherwise specially organized) and does not depend on the structure or relative size of the repeat multi-primary color matrix (MxU) which is used to populate the display area (DA) of the display panel in a tessellating manner. The generic spatial processing algorithm of unit 420 assumes that all five primary colors (RGBYC) exist in all of the target pixels even though in the actual display panel (e.g., one populated by FIG. 1A) this is not true. In other words, each pixel represented by the output of the multi-primary converter 410 is characterized as a set of five values respectively representing the five primaries intensities $c_i$ i=1 ... 5, where each intensity is normalized as being in the range, $0 \leq c_i \leq 1$ so that their linear combination represents the initially required color, C:

$$\vec{C} = \begin{pmatrix} X \\ Y \\ Z \end{pmatrix} = \sum_{i=1}^{5} c_i \begin{pmatrix} X_i \\ Y_i \\ Z_i \end{pmatrix} = \sum_{i=1}^{5} c_i \vec{P}_i \quad (1)$$

wherein C is a vector in the XYZ absolute color space (Z being luminance) and thus generically representing the required color, and X, Y and Z are the respective coordinates of this vector along the axes of the color space (e.g., the CIE 1931 color space). Pi is a vector in the XYZ space representing the primary, and $X_i$, $Y_i$ and $Z_i$ are its respective coordinates along the axes of the color space. The coefficients $c_i$ represent the amount of each of the primary vector in the linear combination that represents the color C. Although the limit of $c_i$ i=1 ... 5, is given as an example, it is to be understood that equation (1) is merely exemplary and that the present teachings may be implemented with any given number of primaries greater than 3.

The spatial processing unit 420 takes the values $c_i$ that are produced by the generic multi-primary converter 410 for each input pixel and converts these generically produced parameters into new values $c_i'$ which take into account the specific structure of the multi-primary color matrix layout (MxU) of the utilized multi-primary panel (not shown). In accordance with the present disclosure, the spatial processing unit 420 is composed of several sub-units that are configured to reduce the visibility of the texture artifacts that develop when uniform color field are to be displayed and which correct the artifacts produced by single pixel wide features. Finally, the signal formatting unit 430 takes the $c_i'$ values of the respective pixels and addresses them for application to the relevant ones to the sub-pixels of that pixel.

The spatial processing unit 420 is composed of one or more first sub-units configured for reducing texture anomaly visibility and of one or more second sub-units configured for correcting single pixel wide feature anomalies. Each of these units operates at the whole pixel level (and not at the sub-pixel level) in order to keep a 1-for-1 relationship between input and output pixels. Applying sub-pixel rendering methods to enhance the apparent resolution above the pixel level (at the horizontal directions) involves in many cases low pass filtering in order to avoid aliasing. This low pass filtering soften the edges of single pixel features, which we would like to avoid as much as possible, especially in black and white text and lines.

Figure 2:
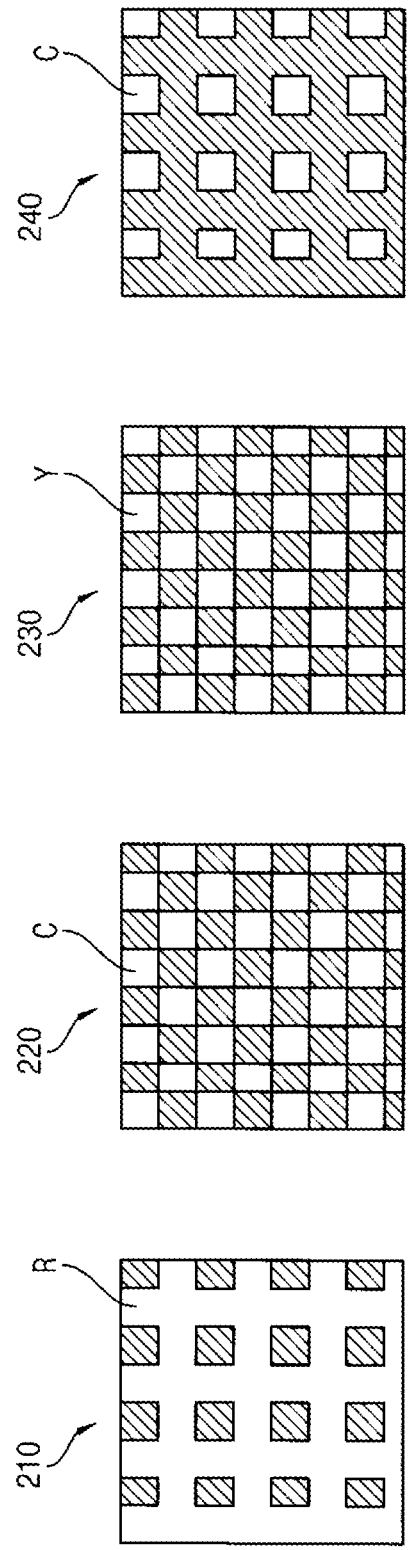
FIG. 2 shows how nonuniformity in displayed texture may occur when fields of respective pure colors such as all Red, all Green, all Yellow and all Cyan are displayed adjacent to one another to thus exasperate the undesirable texture effects discussed above and addressed by various embodiments of the present disclosure of invention.

FIG. 2 depicts (at a pixel-by-pixel level of resolution) how textures obtained for the all Red, all Green, all Yellow and all Cyan fields are spatially distributed when using the multi-primary color matrix layout (MxU) of FIG. 1A for example. (In the layout of FIG. 1A, the Blue sub-pixel appears in each of the 4 pixels of the multi-primary color matrix and thus it has the same spatial distribution as that of a conventional all RGB layout.) It is to be understood that for mixed colors the resultant texture is a combination of these basic textures. The most disturbing nonuniformity in texture occurs for fields that are all Red and all Cyan (210 and 240 respectively), while the all Green and all Yellow textures are relatively more uniform and thus their spottiness is usually not visible to the human viewer. The increased visibility of the spottiness of the red and the cyan textures (whose lit up pixels are represented as white areas in respective depictions 210 and 240) may be associated with the fact that they contain low spatial frequency components. More specifically, for the case of the multi-primary color matrix layout (MxU) of FIG. 1A, the Red sub-pixel is present only in every other pixel of the upper row of pixels and is present in each and every pixel of the lower row of pixels. Thus when considered at the pixel-by-pixel level of resolution as is done in FIG. 2, a lit-up-with-Red pixel shows up at a horizontal frequency of one out of every two pixels (1/2) in each top row of a respective multi-primary color matrix layout (MxU). On the other hand, a lit-up-with-Red pixel shows up at a horizontal frequency of two out of every two pixels (2/2) in each top row of a respective MxU. Similarly, when considered in the vertical direction, a lit-up-with-Red pixel shows up at a vertical spatial frequency of two out of every two pixels (2/2) in each left column of a respective MxU like that of FIG. 2A. On the other hand, a lit-up-with-Red pixel shows up at a vertical spatial frequency of one out of every two pixels (1/2) in each right column of the respective MxU (e.g., that of FIG. 1A). Therefore a more luminent set of Red vertical stripes and a more luminent set of Red horizontal stripes each shows up in the depiction of part 210 of FIG. 2 as interlaced between a comparatively less luminent set of Red vertical stripes and a comparatively less luminent set of Red horizontal stripes.

Referring to portion 240 of FIG. 2, there the texture anomaly effect is even more striking because a comparatively more luminent set of Cyan vertical stripes and a comparatively more luminent set of Cyan horizontal stripes (each having a respective column or row direction spatial frequency of one out of every two pixels (1/2)) shows up in the depiction of part 240 of FIG. 2 as interlaced with a blackened and thus comparatively less luminent in the Cyan color set of black vertical stripes and a comparatively less luminent set of black horizontal stripes.

In accordance with the present disclosure, the reduction of anomalous texture visibility is obtained at the primarily all one color level (although some work can be done at the mixed but still substantially all one color level) by use of two principles. The first utilized principle is that of color substitutability that for example allows replacing each lit-with-yellow-only pixel with an adjacent RGB pixel whose respective red and green sub-pixels are lit up. Similarly, the principle of color substitutability allows for each lit-with-cyan-only pixel to be replaced by an adjacent RGB pixel whose respective green and blue sub-pixels are lit up. The second utilized principle is that of giving preference to having the higher spatial frequency checker boarded arrangements (of yellow and green textures) being lit up over having the all red and/or all cyan textures being lit up.

In one exemplary embodiment, three different corrections are applied: the so-called, yellow correction (Ycorr), cyan correction Ccorr), and red correction (Rcorr). The yellow and cyan colored substitute pixels can be created by use of metameric combination of other primaries (red and green combined to create a substitute for Yellow, green and blue being respectively combined to create a substitute for Cyan). The illustrated arrangements in FIGS. 1A and 1B support such metameric replacements, since the yellow and cyan substitutes can be reproduced by and partially or fully substituted for, by the adjacent RGB pixels. Although metameric substitution is per se known in the art, embodiments of the present disclosure go one step further by using the metamer replacement (and/or partial replacement) in order to increase the perceived spatial resolution of the fully/partially replaced original sub-pixels. This objective may be realized for any N×M primary matrix layout (where each of N and M is greater than one) and with any given numbers of primaries as long as their substitutive metameric combination is present for lighting up in immediately adjacent pixels. More specifically, and for the example layout of FIG. 1A, the spatial resolution of the yellow-only pixels can be increased from 2 out of 4 (2/4) to 4 out of 4 (4/4) by using the RG metamers of the immediately surrounding 4 RGB pixels (those of the instant multi-primary color matrix layout (MxU) and those of two immediately adjacent MxU's). In a similar manner, the spatial resolution of the cyan-only field of pixels can be increased from 1 out of 4 (1/4) to 3 out of 4 (3/4) by selectively using one or more of the immediately adjacent BG metamers as substitutes. By using such a correction both the texture uniformity and the single-wide feature issues are solved. It is understood that the RGB layout discussed herein is presented by way of example and should not be construed as limiting. Other alternative but equivalent matrix layouts are contemplated here.

Figure 4B:
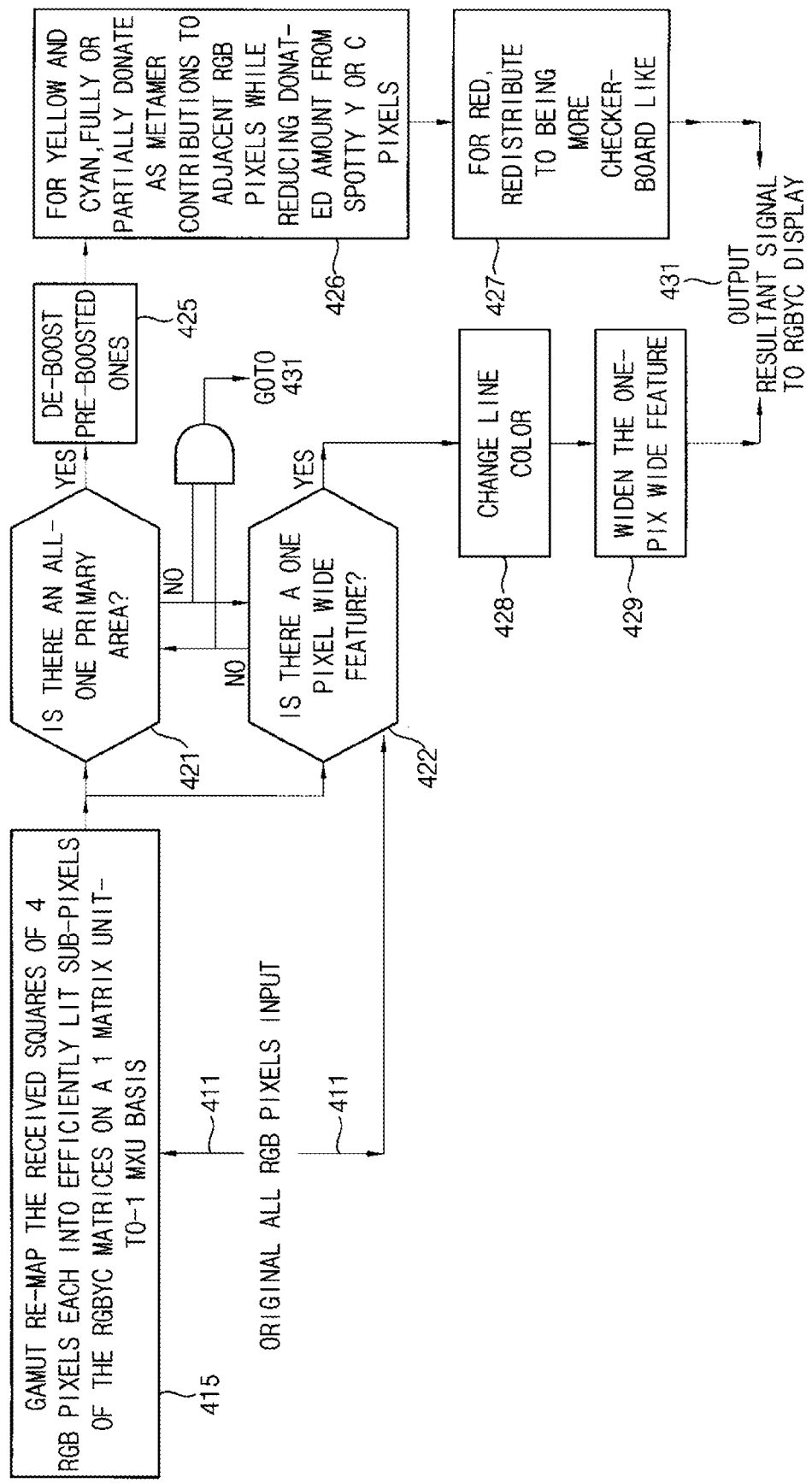
FIG. 4B shows a process flow chart.

Referring to FIG. 4B, the algorithm works as follows. In step 415, the received RGB-only image data 411 is gamut remapped into the newly available RGBYC space. More specifically, the RGB-only values of each received square of four RGB-only pixels are respectively remapped to more efficiently use the available RGBYC gamut space capabilities of a 1-for-1 corresponding multi-primary color matrix layout unit (MxU). In other words, appropriate ones of the RGBYC sub-pixels in the corresponding MxU unit (e.g., that of FIG. 1A) are lit up so as to reproduce the effective color and luminance of the original square of four RGB-only pixels while making more efficient use (if possible) of the available RGBYC gamut space capabilities. Yet more specifically, rather than using only Red and Green sub-pixels for producing a Yellowish color (as an example), the available Yellow sub-pixels (2 in FIG. 1A) are lit up to a maximum extent possible so as to make use of their more efficient luminance generating capabilities for creating a color that has Yellowish color content. Therefore the output of algorithm step 415 (which has a corresponding physical signal output from block 410 of FIG. 4A) is a signal that represents a more power-consumption efficient way of the creating the effective color and luminance of the original square of four RGB-only pixels. In one embodiment, a so-called, boost factor is used to increase the luminance outputs of the yellow and cyan sub-pixels so as to account for their relative lower density per unit area as compared example to that of the blue sub-pixels.

Next, two tests are performed, 412 and 422, either in parallel with one another or in sequence where the second is performed after the first. Test 421 automatically determines whether there is an all Red, all Green, all Yellow or all Cyan field of appreciable size present in the gamut remapped image whereby the texture anomaly effects described above are likely to be seen by a human viewer. If yes, corrective actions are to be taken as will be described soon below. Test 422 automatically determines whether there is a single-pixel wide feature such as a line or a small thickness glyph (e.g., alphabetic letter) present whereby the single-wide anomaly effects described above are likely to be seen by a human viewer. If yes, corrective actions are to be taken as will be described soon below. If both tests produce a No result, a jump is made to step 431 where the initially produced drive signals of the generic gamut mapping (410, 415) are passed on without correction for artifacts.

Referring next to step 425, first, the luminance values of the original yellow/cyan signals which are available for each pixel are multiplied by a counter-correction factor that takes into account the fact that the originally input yellow/cyan signals were calculated based on an assumption that only a small fraction of the output pixels will have yellow/cyan sub-pixels and therefore the luminances of these have to be artificially boosted to make up for the reduced concentration per unit of area of such yellow/cyan sub-pixels. The counter-correction factor therefore undoes the artificial boost. Then, for each RGB pixel, the amount of yellow/cyan that can be placed within this pixel (the RGB pixel under consideration) is re-calculated to be set of two values, one being the minimum one of the set and defining the originally required yellow/cyan signal content for this pixel and the other being the maximum range defining one of the set by defining the amount of additional yellow/cyan content that can be reproduced by metamer substitution being added into this pixel (based on the already exiting RG/GB signals in this pixel and how much more of increased luminance the RGB resources of this pixel can produce). In order to maintain the average color per unit area, a balance may be struck between the amount of yellow/cyan reduced from the yellow and the cyan sub-pixels of the adjacent RYB or CYB pixels and that transferred to one or more of the four RGB pixels surrounding the RYB or CYB pixel (see FIG. 1A) so that an approximately average yellow/cyan luminance density is uniformly maintained as between the donor RYB or CYB pixels and the metamer substitution receiving one or more of the adjacent (done) RGB pixel(s). In order to maintain resolution a simple averaging function may be replaced with a bi-lateral filter that averages in uniform areas, but intelligently does not smooth sharp transitions.

Yellow Correction (Ycorr)

Although the yellow correction (Ycorr) is optional because the yellow checkers texture (230 of FIG. 2) is not highly visible to most viewers. However, if desired, this Ycorr correction algorithm may be used in order to further reduce visibility of the structure, and thus improve the apparent resolution particularly as a part of the single pixel wide feature correction.

The Ycorr correction process is based on the fact that the two pixels within the matrix unit (MxU) not containing a yellow sub-pixel are the RGB pixels, in which case a substitutional yellow content can be produced in (or added into) those RGB pixels by combination of red and green content of those RGB pixels. Thus, yellow can be effectively produced in all pixels of the illustrated matrix units (MxU's).

Assuming that the yellow primary can be viewed as a linear combination of the red and the green primaries, this may be mathematically represented as:

$$\vec{P}_Y \approx \beta_R \vec{P}_R + \beta_G \vec{P}_G \qquad (2)$$

wherein $P_Y$, $P_R$ and $P_G$ are the vectors in the XYZ space representing the yellow, red and green color components respectively. The coefficients, $\beta_R$ and $\beta_G$ are the amounts of the red and green color components respectively such as a linear combination of them provides a color close to or equal to the given yellow input.

The color can be represented as:

$$\vec{C} = \sum_{i=1}^{5} c_i \vec{P}_i = \sum_{i=C,B,R,G} c_i \vec{P}_i + c_Y \vec{P}_Y = \qquad (3)$$

$$\sum_{i=C,B,R,G} c_i \vec{P}_i + c_y(\beta_R \vec{P}_R + \beta_G \vec{P}_G) = \sum_{i=C,B} c_i \vec{P}_i + \sum_{i=R,G} c_i \vec{P}_i$$

Equation 3 above describes the way the yellow primary is replaced by a combination of red and green primaries. The color C is composed from respective amounts $c_i$ of the respective primary color sources Pi where in the case of five primary color sources display discussed here i=Cyan, Blue, Red, Green, and Yellow. The $c_i$ values for blue and cyan do not change, while the ci values of red and green are changed to new values so as to include yellow component that is being donating into the current matrix unit (MxU). At the same time the old value of $c_i$ for yellow is eliminated. Thus the new $c_i'$ are: $C_B' = c_B$, $c_C' = c_C$, $C_Y' = 0$, $c_R' = c_R + \beta_R \cdot c_Y$, $c_G' = c_G + \beta_G \cdot c_Y$. Note that although equation 3 represent a case in which all the yellow component is replaced (fully replaced) by red and green combination, in the more general case only part of the output yellow amount need be replaced by a substitutional red and green metamer combination.

As may be noted, this is a simplified version. In practice, the $c_Y$ value can be more elaboratively calculated based on the fact that yellow is missing in two out of the four pixels of the matrix unit (MxU) and thus area based boosting might be warranted. Furthermore, if the combination of the colors already contains red and green the new $c'_{R,G}$ may be larger than 1, and thus cannot be reproduced as will be indicated by the maximum addition range value described above.

It would be advantageous to keep the intensity over corresponding area of the yellow (the yellow density) fixed while presenting yellow at the amount required for each pixels. The yellow signal in the multi-primary conversion is calculated assuming that only half of the pixels have yellow sub-pixel. Therefore, the yellow signals should be divided by a factor of two if yellow is reproduced at all pixels. As shown in the layouts shown in FIG. 1, yellow appears in only two out of the four pixels. During the multi-primary conversion (410) the amount of yellow primary is calculated so that if these amounts are provided by the yellow sub-pixels (that exist only in two out of the four pixels) a correct color reproduction is obtained (yellow signals may also be calculated for pixels that do not contain yellow sub-pixels, but such pixels cannot contribute yellow signals without applying yellow correction method). If however, it is wished to create yellow in pixels not containing yellow emitting sub-pixels by instead using the red and green emitters, an appropriate pre-reduction in the amount of yellow signal is first calculated for the pixels, for example reducing by a factor of two, to take into account the fact that yellow component (after substitutional metamer donation) is now contributing to four out of four pixels instead of just two out of four pixels.

However, as stated before, the possibility to produce yellow in the RGB pixels is limited by the magnitude of the original red and green signals which may already be consuming part of the maximum drive capabilities of the R, G, B sub-pixels. Thus, for each RGB pixel it is calculated how much additional yellow can be reproduced (added on) based on the original red and green signals.

It may be noted that each yellow containing pixel such as the CYB and RYB pixels of the layout shown in FIG. 1A is surrounded by four RGB pixels. Thus, in order to keep the original yellow intensity even though the amount of the yellow signal in the CYB and/or RYB pixels is being reduced, the yellow content needed to keep the area's average amount of yellow roughly the same is transferred to the four surrounding RGB pixels according to their limitations and/or according to any special spatial positioning of the yellow emitting points as may be desired.

Averaging over the amount of yellow transferred to the RGB pixels is not a problem in the case of a uniform yellow field, but it may cause smoothing of sharp transitions (as in the case of single pixel wide features) if the metamer substitution is being carried out in a not all Yellow field. Thus, the low pass spatial filter doing the averaging may be replaced with an intelligent bi-lateral filter, designed to smooth uniform areas but avoid smoothing at detected sharp edges. The bi-lateral filter performs weighted averaging (convolution), in which the weights depend not only on the relative position of the contributing pixel from the center pixel, but also on the color distance between the two. The bi-lateral filtering is performed based on the amount of yellow that can be created in adjacent pixels of the RGB kind (according to the limits and the required level of donated yellow content), where the color distance is measured between the changes in red and green due to the yellow correction in pixel of RGB type, with respect to that resulting from applying yellow corrections to the center pixel (either CYB or RYB).

Thus in summary, the steps involved in the yellow correction (Ycorr) process are: calculating the amount of yellow that is to be substitutively reproduced by each adjacent RGB pixel; deduce the amount of donatable yellow content to each adjacent RGB pixel from the limits derived in step 1 and the required total yellow signal of the matrix unit (MxU) (given by the converted multi-primary data for that MxU unit); and averaging (using bi-lateral filter to keep high frequency spatial components) over the amount of yellow that can be transferred to the adjacent four RGB pixels surrounding each non-RGB pixel containing a yellow sub-pixel (type 2 and 3 pixels); and reducing the yellow signal of those non-RGB and yellow-donating pixels, according to the amount of yellow content transferred to the adjacent RGB pixels.

Cyan Correction (Ccorr)

Cyan correction is similar to yellow correction with some necessary modifications. In particular, cyan is present only in one out of the four pixels (only at type 2 pixels) and can be reproduced by three out of the four pixels (the CYB and the two RGB pixels of FIG. 1A for example). The cyan signal that is obtained from the converter is calculated assuming that only one out of four pixels contains cyan. Thus, if cross-donation to use the other three available pixels is to take place for purpose of cyan metamer substitution, the original signal values should be divided by three. Moreover, after averaging the amount of cyan transferred to the RGB pixels, the resulting value should be divided to two, because only one CYB pixel is transferring its energy in the case of Cyan, while in the case of yellow, the transfer (donation) occurs from both CYB and RYB sourcing pixels. For reasons explained later cyan correction (Ccorr) is preferably done before yellow correction (Ycorr) takes place. More specifically, when calculating the limits for the yellow correction the preceding change in the green primary due to the cyan transfer has to be taken into account.

An additional difference is the color accuracy, while the yellow primary is very close to the red-green metamer line and therefore the replacement of yellow with red and green does not de-saturated the color so much, the cyan is more saturated than the corresponding green-blue metamer combination. In one embodiment, only green-blue is used but alternatively, one may compensate for the de-saturation by removing some red and yellow from the overall mixture combination of the matrix unit (MxU) if such primaries exist in the combination.

Alternatively, only partial correction may be carried out so even though a certain amount of cyan can be transferred from the cyan containing pixel to one or more of the adjacent RGB pixels, not all of this amount is transferred, thus some residual amount of cyan component is left in the original cyan containing sub-pixel.

Red Correction (Rcorr)

In the case of red, no additive combination of the other available colors can create this primary. Thus, in the case where an all Red field is to be presented without the striping artifacts while using the matrix unit (MxU) configuration of FIG. 1A, the red texture is made more similar to the less visible checkers board structures of the all Green and all Yellow textures shown at 220 and 230 respectively of FIG. 2. Originally, after the generic gamut remapping (410, 415), the red data is distributed over three sub-pixels (in two RGB pixels and RYB pixel) of the FIG. 1A example with each of these 3 pixels getting the same Red emission value. If the red signal is smaller than ⅔, it may be used only the two sub-pixels in type 1 pixels to represent the red signal, while setting the red sub-pixel at RYB pixel to zero. This will create the required checkers board texture. If the total red signal is larger than ⅔ of the maximum red luminance producible by the matrix unit (MxU), as much as possible from the original signal is placed into the two sub-pixels of RGB pixels of the given matrix unit (MxU), and the rest is left behind in the red sub-pixel of the RYB pixel.

Figure 5:
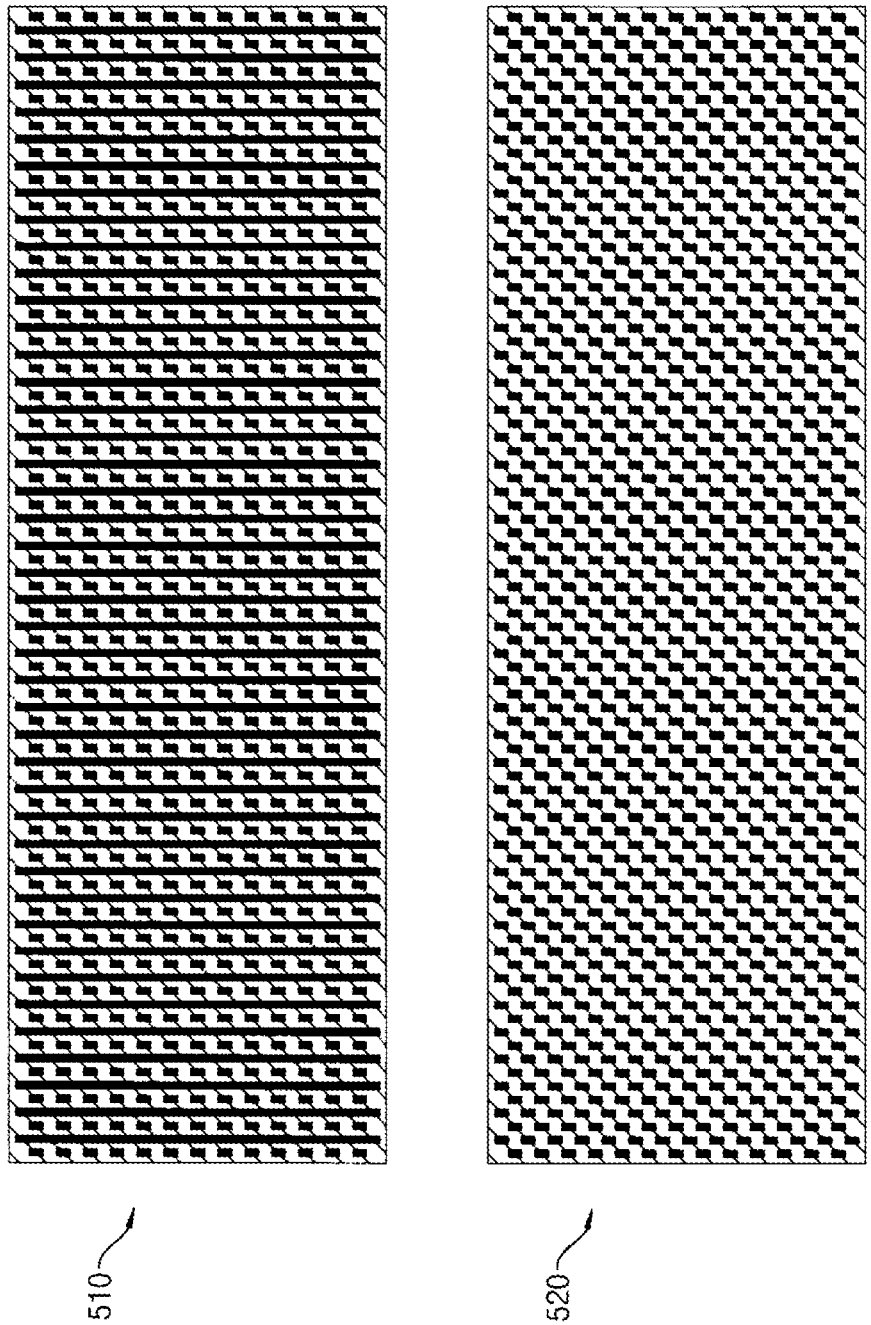
FIG. 5 shows color display diagrams illustrating a texture effect correction according to some embodiments of the present disclosure.

FIG. 5 shows color display diagrams illustrating texture effects from corrections made according to some embodiments of the present disclosure. Portion 510 shows the red texture (black being red pixels) before the correction (conversion to a more checker-board disposition) is made and portion 520 illustrates the corrected red in which vertical striping of red is less visible due to the more radially uniform spatial frequency of red placement in the various sub-pixels.

The implementation may be done by automatically examining the three Red-containing sub-pixels in any full color unit (MxU). The following steps are then automatically performed: the two RGB pixels are examined to check how much additional red intensity can be transferred to each of them. The limit is placed at the minimum between these two values; the pixel of RYB is examined to understand how much red intensity is placed on it; the amount to be transferred to each of the RGB pixels is set at the minimum of the limit and half of the red intensity of RYB pixel; and the red signal at RYB pixel is reduced by twice the amount set at stage 3, and the red signals at pixels of the RGB type are each increased by the same amount.

This correction works very well on areas in which the red intensity in not close to maximum (saturation), reducing the visibility of the nonuniform texture. However, it disturbs the behavior of a single pixel wide line. This can however, be accommodated by control signals obtained from the feature correction unit.

In order to maintain resolution, the correction is done on a small 2×2 pixel window. Referring to FIG. 1A in which there are two, so-called, diagonal pixels containing red and one non-diagonal pixel depicted there. For each of the non-diagonal pixels which is lit as a red one, the amount of red that can be added (donated) to the diagonal pixels is calculated, and these values are used to derive how much of the red signal from the lit up non-diagonal sub-pixel may be transferred to the diagonal red-sub-pixels. That amount may be the sum of the individualized amounts that may be respectively transferred to each of the diagonal sub-pixels, or the minimum of these amounts if the transfer is required to be symmetric. Although the description here is given in terms of red color signals, it may fit any other color that is arranged in a similar manner to the red sub-pixels in FIG. 1A. The result is that the red content of the lit up non-diagonal pixel is transferred to the extent possible to the diagonals so as to mimic as best as possible the checker-board spatial distribution effect and thus reduce texturing artifacts.

Red—Cyan Correction

While the yellow and the cyan can be corrected (at least partially) using a metamer combination, red cannot be corrected in such a manner. However, some correction can be made in uniform areas, by requiring that the average color of the RYB/CYB pixels will stay the same and that the luminance of two pixels will be the same. Thus, if the original signals are r, c, y, b; the system automatically solves for new signals r', c', y', b' for each of the pixels that fulfill the following conditions:

$$r\vec{P}_R + c\vec{P}_C + 2y\vec{P}_Y + 2b\vec{P}_B = r'\vec{P}_R + c'\vec{P}_C + (y'_{RYB} + y'_{CYB})\vec{P}_Y + (b'_{RYB} + b'_{CYB})\vec{P}_B \quad (4a)$$

$$r'Y_R + y'_{RYB}Y_Y + b'_{RYB}Y_B = c'Y_C + y'_{CYB}Y_Y + b'_{CYB}Y_B \quad (4b)$$

In the case of the layout in FIG. 1A there are two RGB pixels on the diagonal and RBY and CBY pixel on the other diagonal. Assuming that these two pixels originally obtain the same signals, $c_R=r$, $c_G=g$, $c_Y=y$, $c_C=c$ and $c_B=b$, the compound color created by these two non-RGB pixels is written in the left hand side of equation 4a. An equivalent but alternate combination can be created by using different signals on which we do not place the limitation that the signals for the two pixels must be the same. This new set of signal parameters is marked by r', c', b' and y' with a subscript indicating to which pixel they are relevant to. The new signals are chosen so that compound color created by the new combination (the right hand side of equation 4a) gives essentially the same color as the "original" compound color, and that the luminance of the RYB pixel is substantially equal to the luminance of the CYB pixel as show in equation 4b. In this equation $Y_i$ stands for the luminance of primary i, i=R, Y, B, C.

Here it is assumed that the original b and y signals for both pixels are the same. One simple solution is to keep r=r', c=c' and to compensate the luminance difference by changing the yellow and blue signals, so that the modified RYB y' and b' signals are (1+d) times the original y and b signals and the CYB signals are (1−d) times the original signals. This ensures that the total amount of Y+B and the total ratio between Y and B are kept fixed. The value of d is set so that the amount of Y+B luminance transferred from the RYB to the CYB pixel is half the luminance difference between the cyan and the red.

Single Pixel Wide Feature Correction

Single pixel wide and primary colored lines displayed on black or white background and single pixel wide white or black lines displayed over primary colored backgrounds may be problematic. Single pixel wide primary color lines may appear discontinuous or even completely disappear from being seen due to gamut remapping effects. Single pixel wide black lines over a primary background may appear as having different thickness or disappear. This is usually not a problem, since the data does not usually contain single pixel wide lines of a primary color, but nevertheless several methods for solving this problem have been devised.

The origin of the feature problems is that not all primary colors appear in all pixels. Therefore, the two main approaches for solving the problem are to avoid single primary lines by using mixture of colors instead of a single primary color to depict the line. Alternatively to avoid the problem of single pixel wide lines, since in wider lines the sub-pixels representing all primaries exist, switch to wider lines. The first approach allows single pixel lines (having the maximum resolution) to exist but limits the span of the colors allowed in such lines, regardless whether they are features or part of an image with almost no high frequency content. The second approach limits the effective resolution by low-pass filtering (thus avoiding single pixel wide lines), but the full color gamut may be used. The softening of edges and lines by low pass filtering affects also black and white text and graphic elements, which should be avoided or minimized. Thus, additional methods that mix the two approaches, based on the type of data have been developed. The following describes these different modes of operation for feature correction.

In one embodiment the problem is dealt with by using only part of the color gamut. If an input green or red line (single width line) is mapped into a combination of colors rather than just to the green or red primaries, the issue of having a single pixel primary line is reduced because the gaps are filled by the alternate colors. By mapping green at the input to a mixture of the green primary with some of the yellow primary mixed in the gap spots, it is assured that the green single pixel width line signal is represented by some sub-pixels in each of the pixel types. Other mixtures can be done for the red. The yellow can be mapped to combination of yellow, red and green, the cyan to combination of cyan, green and blue.

This method operates globally over all pixels in the display, whether or not belonging to graphic elements. The disadvantage is that the resulting gamut is smaller than the full color gamut of the display. One may apply one setting for video data (for which single pixel features are not expected) that use the full color gamut, and another setting for graphic data input (in which single pixel wide features may be present) that use the more limited gamut. The system may switch between the two different settings, using a control signal from the source. Alternatively, automatic switching between the settings, based on analysis of the input data may be applied.

Low pass filtering of the multi-primary signals would eliminate single pixel wide features in the filtered data. However, this would smooth the desired edge transitions, especially black/white transitions such as text, resulting in softened, less contrasty text appearance, reducing the apparent resolution. However, when applying sub-pixel rendering methods to enhance the apparent resolution above the pixel level (at the horizontal directions) there is involved, in many cases, a low pass filtering in order to avoid aliasing. This low pass filtering also softens the edges of single pixel features, which should be avoided as much as possible, especially in black and white text and lines. Thus, certain embodiments in accordance with the present disclosure work only at the pixel level, and are designed to ignore white/black features (and other gray only features).

In another embodiment the elimination of single pixel width single primary features is based on low pass spatial filtering of the original pixel multi-primary data. However the filtering is applied only to "chroma" channels and not to the luminance component. Thus, the full bandwidth of the luminance signal is kept, and only the "chroma" signals that carry zero luminance information are filtered. While "chroma" signals are well defined in a three-dimensional color space, this is not the case for multi-primary signals. Defining the multi-primary "chroma" is essential in the development of the filtering method described here. The multi-primary signals $c_i$ (i=1 ... 5) define the color of the corresponding pixel as:

$$\vec{C} = \sum_{i=1}^{5} c_i \vec{P}_i \qquad (5)$$

In particular the luminance of the color is given by:

$$Y = \sum_{i=1}^{5} c_i Y_i \qquad (6)$$

Here $Y_i$ are the luminance of the primary i normalized by the luminance of the native (raw) white. For the native white all $c_i$=1 (i=1 ... 5), and $$Y_W - \sum_{i=1}^{5} Y_i - 1.$$

New signals $d_i$ are now defined so that $d_i=c_i-Y$. It can be easily seen that the $d_i$ signals do not carry luminance information and thus can be used as adjustable multi-primary "chroma" signals.

$$\sum_{i=1}^{5} d_i Y_i = \sum_{i=1}^{5} (c_i - Y) Y_i = \sum_{i=1}^{5} c_i Y_i - Y \sum_{i=1}^{5} Y_i = Y - Y \cdot 1 = 0 \qquad (7)$$

The current embodiment is based on low pass filtering the multi-primary "chroma" signals $d_i$. The spatially filtered signals $\tilde{d}_i$ also do not carry luminance information, and thus the new signals $C_i'$ are:

$$c_i' = \tilde{d}_i + Y = \tilde{c}_i + Y - \tilde{Y} \qquad (8)$$

For black and white (or gray only) signals, $c_i$=Y for all i= 1 ... 5, and thus $d_i$=0, and the same for the filtered signals. Thus, $c_i'$=$c_i$ and the full resolution is kept. For colored signals, the averaging over $d_i$ mixes the different colors, but nevertheless keeps (at least mathematically) all the original luminance information. In practice, since after the filtering some ci' may be negative, and some others may be above 1, clipping is applied. This clipping and the fact that not every pixel has all primary colors limits the possibility to fully restore the original luminance information.

Although the description above is given in terms of a five primaries example (RGBYC), it may be modified so that it may apply only to a case of only three out of the five primaries, for example red, green and cyan. In the case of the layout shown in FIG. 1A, blue sub-pixel is present in each of the pixels, it is not required to process the blue signal. In a similar manner yellow exist in each of the pixels, either as a yellow sub-pixel or as a combination of red and green after applying yellow correction (using red+green to represent yellow signal in pixels that do not contain yellow). Therefore, the yellow and the blue signals are not low pass filtered, and yellow correction is applied after the filtering.

The advantage of this embodiment is that it keeps to a large degree the high frequency component of the luminance and removes only high pass components of the multi-primary "chroma", to which the human visual system is less sensitive. Therefore, single pixel white/black features stay intact, and the same is true for pictorial data that do not contain high frequency "chroma" data. Only single pixel wide primary lines are affected, so that a mixture of primaries is created and line is slightly softened. Thus, in this embodiment only the color and the resolution of single pixel wide primary lines and edges is strongly influenced.

In the previous embodiment the resolution of single pixel wide black/white features is kept, but single pixel wide primary features are softened. In yet another embodiment the softening of single pixel primary features is minimized by detecting pixels constituting single pixel primary features that do not have the required primary color, and replacing the required primary color with another primary or combination of primaries, so that the feature will appear continuous (although slightly different in color), and with minimal or no effect on its single pixel width.

In this embodiment the system is composed from three units, feature detection, feature identification and primary color correction. When considering the correction it is evident that for example in the case of layout 1A (FIG. 1A) blue does not require correction, since it exists in all pixels. Similarly, yellow does not require correction (after the application of yellow correction) since yellow exist in all pixels, either as a yellow sub-pixel or as a metamer combination of red and green. Red and cyan (after cyan correction) are similar in the structure to be fixed, since they exist in 3 out of 4 pixels (cyan as a sub-pixel or a combination of blue and green following cyan correction), and differ only in the type of pixel in which they are missing. Green is missing in two out of the four pixels and thus requires its own correction.

The feature detection unit operates on the incoming RGB data and finds sharp edges, single lines and smooth areas. The detection may be based on examining the 8-neighborhood of each pixel (for each primary) and deciding how many of the 8 neighbors are connected to the central pixel. This may be done by calculating the difference between the center and the neighbors, and (fuzzy) threshold these differences to determine connectivity values. The sum the connectivity values is used to determine whether we look on a single line (low-medium connectivity), edge of an area (medium-high connectivity), or a point within an area (high-full connectivity). The sign of the sum determines whether the central pixel is on the top or the bottom of the edge/single line. Other methods for detection may also be applied, such as analyzing the derivatives in horizontal and vertical directions, as obtained from convolution with suitable kernels, such as Sobel, Prewitt or others. More advanced methods such as Canny detection may also be applied.

Figure 6:
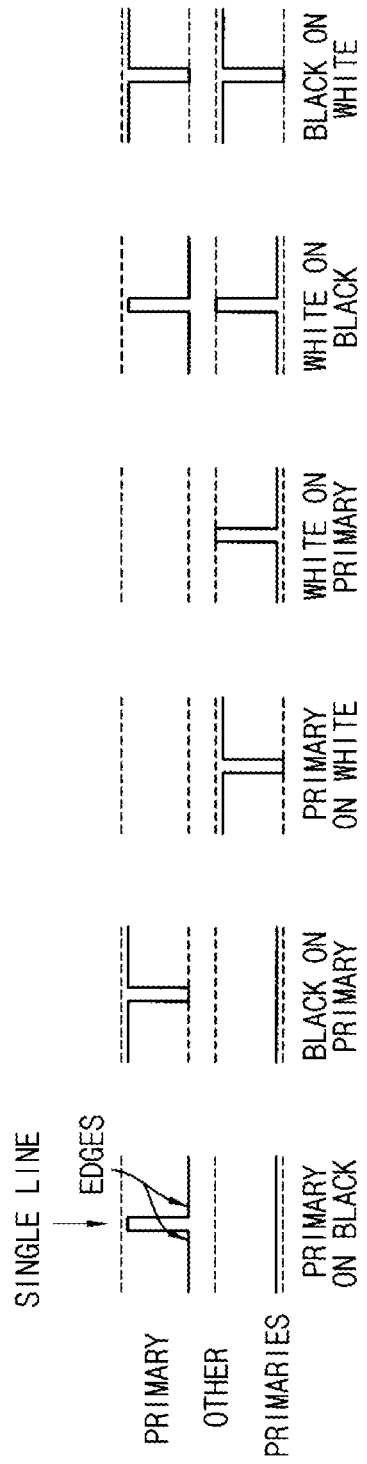
FIG. 6 shows diagrams illustrating undesirable single pixel wide effect types addressed by embodiments of the present disclosure.

The feature identification unit uses the decision of the previous single line/edge and top/bottom classification to determine the type of features from the types shown in the FIG. 6.

The primary on black and black on primary features are marked by detection at the primary itself. The primary on white and white on primary are detected by finding detected features of the rest of the primaries. Finally, white/black features are detected by finding co-positioned features in all primary channels. The identification units thus compare detected features (single line/edge, bottom/top) on all primary channels to determine the interesting features (from point of correction).

in accordance with one aspect of the present disclosure, it has been discovered that single line primary on black and edges of black on primary must be corrected (at least for some of the primaries), and some benefit may be gained also with correcting single line and edge primary on white features. White on primary features and white/black features do not require correction.

The correction is dependent on the primary color and on the type of pixel. For example, for red primary CYB pixels are corrected, while for cyan type 3 pixels are corrected. Some correction on other pixels may also be applied (for improved color consistency). For the green primary both CYB and RYB pixels are corrected. In most cases yellow is used for correcting primaries (i.e. yellow is used to replace green, red or cyan) but some blue may be added to reduce yellowness. The amount of yellow (and blue) added may be linearly dependent on the missing color signal with a proportionally factor that may be adjusted. In general the proportionality factor is such that the added color is lower in luminance than the expected luminance for the missing primary color, but large enough that a line will appear continuous when viewed from reasonable viewing distance.

The advantage of this correction method is that for many of the features it does not affect the resolution of single pixel features, in the sense that the correction is done mainly within the pixels that need the correction. It changes the average color of the features, but operates only locally and mostly within the pixels that require correction.

Figure 3:
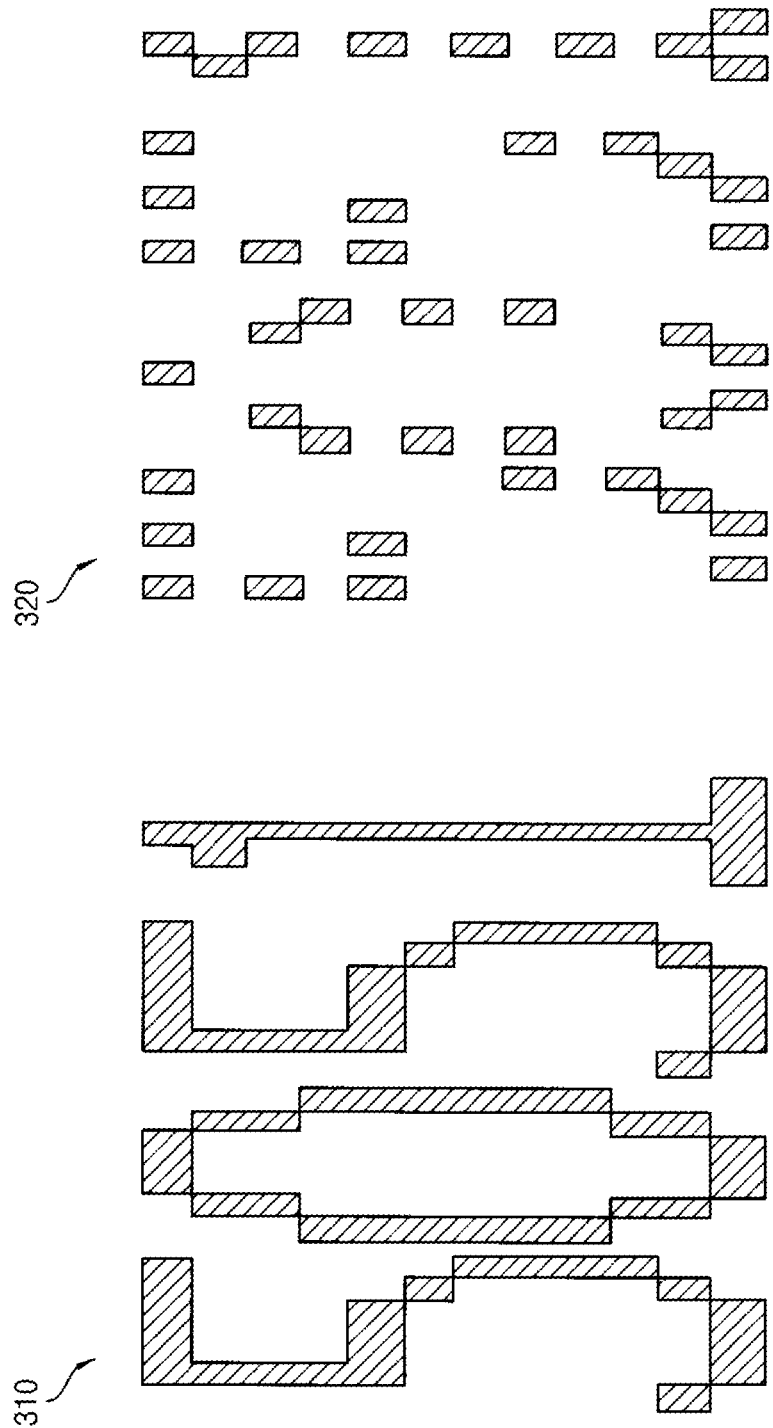
FIG. 3 shows how single-pixel wide lines or other glyphs may be undesirably affected by the multi-primary color matrix layouts (MxU's) of the present disclosure and how such undesired single pixel effects may be addressed by embodiments of the present disclosure of invention.
Figure 7:
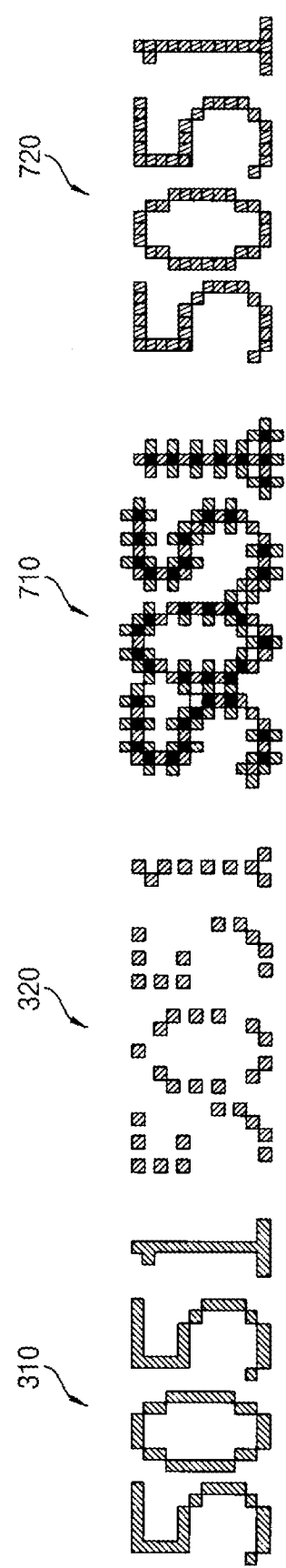
FIG. 7 shows color display diagrams illustrating undesirable single pixel effects and respective effect corrections according to some embodiments of the present disclosure.

FIG. 3 are color display diagrams illustrating the correction of undesirable single pixel wide features according to some embodiments of the present disclosure. Portion 310 is the original data; 320 is the image as displayed on the panel (without corrections). In FIG. 7 and continuing from 310 and 320; portion 710 is the correction using "chroma" only filtering method; and 720 is the correction using the feature correction method.

As will be appreciated by one skilled in the art, aspects of the exemplary embodiment may be embodied as a system, method or computer program product. Accordingly, aspects of the exemplary embodiment may take the form of an entirely hardware embodiment, an entirely software executing embodiment (including firmware, resident software, micro-code, etc.) or an embodiment combining software execution and hardware execution aspects that may all generally be referred to herein as a "circuit," "module" or "system." Furthermore, aspects of the exemplary embodiment may take the form of a computer program product embodied in one or more computer readable medium(s) having computer readable program code embodied thereon.

In the above description, an embodiment is an example or implementation of the inventions. The various appearances of "one embodiment," "an embodiment" or "some embodiments" do not necessarily all refer to the same embodiments.

Although various features of the present disclosure of invention may be described in the context of a single embodiment, the features may also be provided separately or in any suitable combination. Conversely, although the teachings may be described herein in the context of separate embodiments for clarity, the teachings may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the disclosure.

It is to be understood that the phraseology and terminology employed herein is not to be construed as limiting and are for descriptive purpose only.

It is to be understood that the details set forth herein do not construe a limitation to an application of the disclosed teachings.

Furthermore, it is to be understood that the teachings can be carried out or practiced in various ways and that the teachings can be implemented in embodiments other than the ones outlined in the description above.

While the present disclosure of invention has been described with respect to a limited number of embodiments, these should not be construed as limitations on the scope of the present teachings, but rather as exemplifications of some of the preferred embodiments. Other possible variations, modifications, and applications are also within the scope of the present teachings.

What is claimed is:

1. A machine-implemented method of reducing or eliminating visual artifacts producible in a multi-primary color matrix display, where the display has a display area populated by an area tessellating repetition of an N×M matrix unit (MxU), wherein each of N and M is greater than one, the MxU including Red, Green, and Blue sub-pixels as well as further sub-pixels of one or more other colors and where the MxU is divided so as to include at least one red-green-blue (RGB) pixel and at least one non-RGB pixel, the method comprising:

receiving an all-RGB data signal representing a corresponding input image in an all RGB pixels format, the all RGB pixels format being divided into a plurality of N×M arrays each having a respective N×M subset of the received all RGB pixels;

for each N×M array of all RGB pixels, converting the corresponding portion of the all RGB data signal into a corresponding portion of a multi-primary data signal representing a more power efficient way of producing substantially same luminance and chrominance as that of the correspondingly received N×M array while more efficiently using image producing resources of the corresponding N×M matrix unit (MxU), where the corresponding and conversion-produced portion of the multi-primary data signal represents initial drive signals initially used for driving the corresponding N×M matrix unit (MxU) of the display;

automatically determining if the image to be displayed on the multi-primary color matrix display by means of the initial drive signals contains a potential artifact creating situation comprising a single color field populated by a color that creates a texturing artifact or if the image represented by the received all-RGB data signal contains a single pixel wide feature that creates a missing feature artifact; and in response to said automatically determining indicating presence of at least one of said potential artifact creating situations, applying one or more corrections to the corresponding and conversion-produced portion of the multi-primary data signal so as to thereby produce a corrected multi-primary data signal which reduces or eliminates the at least one of the artifacts.

2. The method of claim 1 wherein said applying of one or more corrections includes:

transferring color component intensity from a sub-pixel in a non-RGB pixel to a corresponding metameric combination in at least one adjacent RGB pixel.

3. The method of claim 1 wherein said applying of one or more corrections includes:

transferring color component intensity from a sub-pixel that creates an asymmetric texturing artifact to an adjacent pair of diagonally opposed RGB pixels.

4. The method of claim 1 wherein said applying of one or more corrections includes:

transferring color component intensity from a sub-pixel that creates a loss of resolution in a luminance channel to a differently colored sub-pixel that at least partially restores the otherwise lost resolution in the luminance channel.

5. The method of claim 1, wherein N is equal to M.

6. The method of claim 5, wherein N=M=2 and wherein the at least one non-RGB pixel comprise a red-yellow-blue (RYB) pixel or a cyan-yellow-blue (CYB) pixel.

7. The method of claim 1 wherein the applied corrections are carried out such that an overall luminance level of each primary color as produced in each N×M matrix unit (MxU) before and after the correction is substantially the same.

8. The method of claim 1 wherein a texturing artifact can be created by a primary color that is red and wherein the correction includes increasing an intensity of the red primary color on diagonally adjacent RGB pixels while decreasing an intensity of the red primary color in the non-RGB pixel that includes the artifact-producing red sub pixel.

9. The method of claim 8 and further comprising converting intensity level of the red sub pixels before the correction into luminance representation, shifting luminance between red sub pixels so that an overall luminance of the red color is maintained, and converting back to intensity representation, to yield a corrected level of intensity for applying to the red sub pixels.

10. The method of claim 1 wherein the at least one non-RGB pixel includes a plurality of yellow sub-pixels, the color matrix comprises a red-yellow-blue (RYB) pixel and a cyan-yellow-blue (CYB) pixel, and wherein the correction includes reducing yellow color intensity in the RYB and the CYB pixels while increasing intensity of a metameric combination of red and green in one or more RGB pixels that are adjacent to the respective RYB and the CYB pixels in which the intensity of the yellow color was reduced.

11. The method of claim 1 wherein the at least one non-RGB pixel includes a cyan sub-pixel, the color matrix comprises a red-yellow-blue (RYB) pixel and a cyan-yellow-blue (CYB) pixel, and wherein the correction includes reducing intensity of the cyan color from the CYB pixel while increasing intensity of a metameric combination of red and blue in an RGB pixel that is adjacent to the CYB pixel in which the intensity of the cyan color was reduced.

12. The method of claim 1 wherein the at least one non-RGB pixel includes cyan, wherein the color matrix comprises a red-yellow-blue (RYB) pixel and a cyan-yellow-blue (CYB) pixel, and wherein the correction yields corrected yellow and blue signals in the RYB pixels that are (1+d) times an original yellow and blue signals and the corrected yellow and blue signals in the CYB pixels that are (1−d) times the original yellow and blue signals, and wherein d is a positive integer and is set so that the amount of yellow-blue luminance transferred from the RYB pixel to the CYB pixel is half the luminance difference between the cyan and the red.

13. A machine-implemented method for correcting artifact effects in a multi-primary color matrix display that includes an N×N array of red-green-blue (RGB) and non RGB pixels, wherein N is greater than one, the method being performed on a signal processing apparatus, the method comprising:
receiving RGB data in an all RGB format;
converting the RGB data into multi-primary data, based on a predefined multi-primary color scheme;
determining a multi-primary chroma and multi-primary luminance based on the multi-primary data; and
applying a spatial low pass filter to the difference of the multi-primary chroma and multi primary luminance.

14. A machine-implemented method for correcting artifact effects in a multi-primary color matrix display that includes an N×N array of red-green-blue (RGB) and non RGB pixels, wherein N is greater than one, the method being performed on a signal processing apparatus, the method comprising:
receiving RGB data in an RGB format;
converting the RGB data into multi-primary data, based on a predefined multi-primary color scheme;
determining a type of single pixel feature being one of: primary on black, black on primary, primary on white, and white on primary; and
applying a correction in the case of the determined type of single pixel feature by setting each pixel of a non-represented primary with a nearest combination of other primary colors.

15. An image data signal processing apparatus comprising:
a multi-primary converter configured to receive a first image defining signal that defines a corresponding image as all RGB pixels and that produces a second image defining signal that defines the corresponding image as a mixture of RGB and non-RGB pixels; and
a spatial processing unit configured to receive the second image defining signal, to automatically test the second image defining signal for predefined artifact-producing conditions comprising a single color field populated by a color that can create a texturing artifact or if the image contains a single pixel wide feature that can create a missing feature artifact, and if detected, to automatically reduce or eliminate the predefined artifact-producing conditions.

16. A method for correcting effects in a multi-primary color matrix display that includes an N×M array of red-green-blue (RGB) and non RGB pixels, wherein each of N and M is greater than one, the method being performed on a signal processing apparatus, the method comprising:
receiving RGB data in an RGB format;
converting the RGB data into multi-primary data; and
applying a correction to each one of the primary colors that is not represented by all pixels,
wherein in a case that the primary color is a metameric combination of sub pixels of the RGB pixels, the correction includes combining sub pixels of the RGB pixels to yield the primary color, and
wherein in a case that the primary color is not a metameric combination of sub pixels of the non-RGB pixels, the correction includes shifting intensity of the primary color into diagonally adjacent RGB pixels.

17. The method according to claim 16, wherein the N is equal to the M.

18. The method according to claim 17, wherein N=2 and wherein the non RGB pixels comprise a red-yellow-blue (RYB) pixel and a cyan-yellow-blue (CYB) pixel.

19. The method according to claim 17, wherein the correction is carried out such that an overall luminance level of each primary color in the color matrix before and after the correction is similar.

20. The method according to claim 17, wherein the primary color is red and wherein the correction further includes increasing an intensity of the red primary color on the diagonally adjacent RGB pixels while decreasing an intensity of the red primary color in the non-RGB pixel that includes a red sub pixel.

21. The method according to claim 20, further comprising converting intensity level of the red sub pixels before the correction into luminance representation, shifting luminance between red sub pixels so that an overall luminance of the red color is maintained, and converting back to intensity representation, to yield a corrected level of intensity for applying to the red sub pixels.

22. The method according to claim 17, wherein the primary color is yellow, the color matrix comprises red-yellow-blue (RYB) pixels and a cyan-yellow-blue (CYB) pixels, and wherein the correction includes reducing a yellow color intensity from the RYB and the CYB pixels while increasing the intensity of the yellow color as a metameric combination of red and green from the RGB pixels that are adjacent to each one of the RYB and the CYB pixels in which the intensity of the yellow color was reduced.

23. The method according to claim 17, wherein the primary color is cyan, the color matrix comprises red-yellow-blue (RYB) pixels and cyan-yellow-blue (CYB) pixels, and wherein the correction includes reducing the intensity of the cyan color from the CYB pixels while increasing the cyan color intensity as a metameric combination of red and blue from the RGB pixels that are adjacent to each one of the CYB pixels in which the intensity of the cyan color was reduced.

24. The method according to claim 17, wherein the primary colors are cyan or red, wherein the color matrix comprises red-yellow-blue (RYB) pixels and cyan-yellow-blue (CYB) pixels, and wherein the correction yields corrected yellow and blue signals in the RYB pixels that are (1+d) times the original yellow and blue signals and the corrected yellow and blue signals in the CYB pixels that are (1−d) times the original yellow and blue signals, and wherein d is a positive integer and is set so that the amount of yellow-blue luminance transferred from the RYB pixel to the CYB pixel is half the luminance difference between the cyan and the red.

\* \* \* \* \*